Mar. 6, 1923. 1,447,684.
J. MOSS.
COTTON PREPARING MACHINE AND THE LIKE.
FILED MAY 29, 1922. 2 SHEETS—SHEET 1.
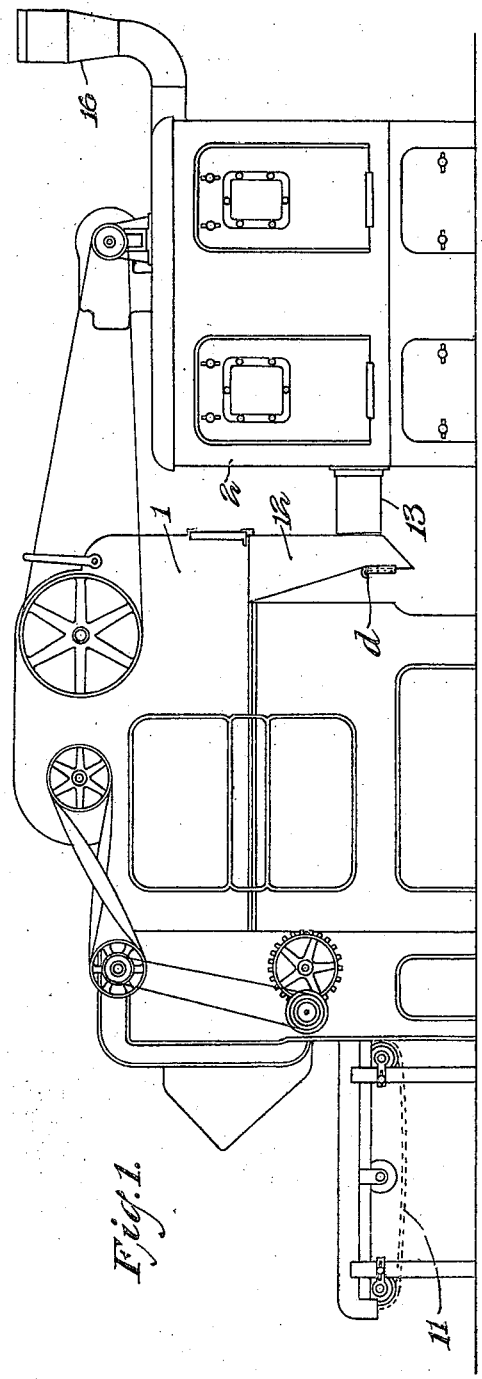
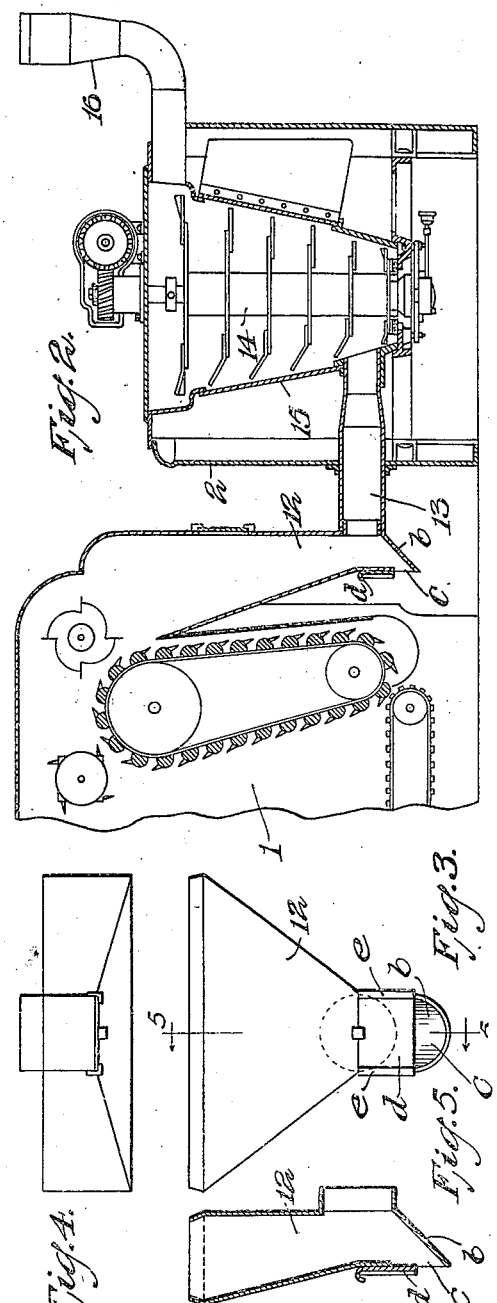
Inventor:
Joseph Moss
by Chas. J. Randall
Attorney.

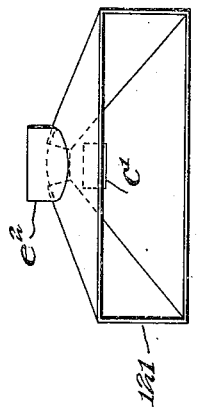
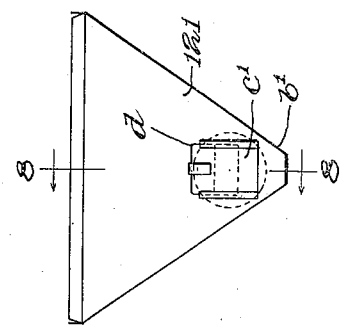
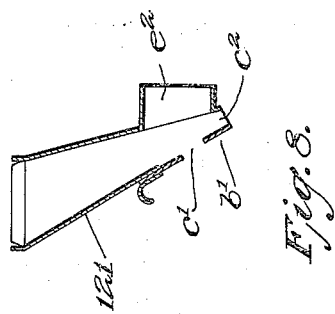

Patented Mar. 6, 1923.

1,447,684

UNITED STATES PATENT OFFICE.

JOSEPH MOSS, OF WOONSOCKET, RHODE ISLAND, ASSIGNOR TO WOONSOCKET MACHINE & PRESS CO., INC., OF WOONSOCKET, RHODE ISLAND, A CORPORATION OF RHODE ISLAND.

COTTON-PREPARING MACHINE AND THE LIKE.

Application filed May 29, 1922. Serial No. 564,322.

*To all whom it may concern:*

Be it known that I, JOSEPH MOSS, a citizen of the United States, residing at Woonsocket, in the county of Providence, State of Rhode Island, have invented a certain new and useful Improvement in Cotton-Preparing Machines and the like, of which the following is a specification, reference being had therein to the accompanying drawings.

The invention has relation to machines used in preparing cotton and other fibrous materials for spinning, and especially to openers and machines associated with the latter and operating to supply cotton, or the like, thereto. A particular association or assemblage of machines having the cooperative relationship just indicated is that of a so-called bale-breaker and an opener. In the case of this association or assemblage of machines, cotton in a more or less compressed state, frequently in thick sheets, taken in certain proportions from different bales of a plurality of bales from which bands and wrappings have been removed, containing cotton of different varieties or grades, is laid upon the receiving apron of a bale-breaker and by the action of the latter more or less mixed and loosened up. From the bale-breaker the cotton passes through a short flue to the adjoining opener, by which the cotton is effectually opened up and torn apart, with the separation of dirt and the coarser and other more easily removed impurities.

It happens with more or less frequency that a bale-band buckle, a nail, a stone, or some other hard object accidentally present in the baled cotton, passes forward to the opener from the bale-breaker or other machine preceding the opener. The rotating cylinder of the opener revolves at an exceedingly high rate of speed, and consequently the striking of the teeth, blades, or beaters of the said cylinder against any such object contained in the cotton entering the opener, produces sparks, with the result that the cotton within the opener is ignited and consumed. In some cases, also, the flame extending through the flue system through which the cotton passes from the opener to a bin or a distributing system, spreads the fire so that great loss results.

The object of the invention is to provide against the entrance into an opener or the like, of a heavy and hard object contained in the cotton passing onward from a bale-breaker, or other machine feeding unopened or only partially opened cotton or the like, through an intermediate flue to the said opener.

The invention consists, essentially, in the combination with an opener, and a machine operating to supply fibrous material to said opener, of a connecting flue having a downwardly extending portion and a change of direction toward the opener, and having also below the bend or angle of the flue a support upon which heavy objects accompanying the fibrous material will fall by gravity, and an air inlet so disposed that by air entering the same and flowing inward over said support fibrous material upon or adjacent the same will be carried to the opener. Thereby any heavy object such as a buckle, a nail, a stone, or the like will be permitted to escape by reason of its gravity from the fibrous material that is travelling toward the opener, so that the fibrous material will enter the opener unaccompanied by such object.

The form of embodiment of the invention may vary more or less in practice. By preference, the support aforesaid is constituted by an incline along which a heavy object landing thereon will slide and thereby become discharged, and the air inlet is so disposed that air entering the same will flow over the foot toward the more elevated portion of said incline, and fibrous material upon or adjacent the latter will be carried to the opener.

The invention is illustrated in the drawings. Two embodiments thereof are shown in the latter, one thereof being represented as applied in combination with a bale-breaker cooperating with a vertical opener.

Fig. 1 of the drawing shows in side elevation a bale-breaker and a vertical opener, in working combination, with one form of mouth-piece in connection with the flue connecting them together, illustrating one embodiment of the invention.

Fig. 2 is a sectional view showing more clearly the relations, etc., of the discharging mouth.

Fig. 3 is a view in elevation of the mouth-piece constituting the vertical portion of the connecting flue between the bale-breaker and opener, showing the mouth at the lower end thereof, and the means for regulating the area of the air-inlet.

Fig. 4 is a bottom view of the said vertical flue-portion and the mouth-piece.

Fig. 5 is a view in vertical section in the plane indicated by line 5, 5, in Fig. 3.

Figs. 6, 7 and 8 are views similar to Figs. 3, 4 and 5, showing the other form of embodiment referred to above, Fig. 8 showing the said form in vertical section on line 8, 8, of Fig. 6.

The bale-breaker 1 and vertical opener 2 shown in Figs. 1 and 2 of the drawings are of more or less conventional type. 11 is the receiving apron of the bale-breaker, upon which cotton, in a more or less compacted state, taken as aforesaid from each of a number of unfastened and unwrapped bales ranged conveniently near the bale-breaker, is laid by the attendant in the predetermined proportions in which the different varieties or grades from the different bales are to be blended. 12, 13, are respectively the vertical and the horizontal portions of the flue through which the cotton goes to the opener after passing through the bale-breaker. The vertical portion 12 is constituted by the so-called mouth-piece which is shown separately in Figs. 3, 4 and 5. 14 is the revolving so-called cylinder of the opener, 15 the perforated shell within which the said cylinder rotates, and 16 is the flue through which the opened cotton is carried to a bin or a distributing system after leaving the opener.

The "cylinder" of a vertical opener is, as shown, conical in shape, its small end being below and its large end above. The cotton to be subjected to the action of the said cylinder is supplied to the small lower end of the cylinder, and as the cylinder rotates the cotton passes from such end upward toward the large upper end of the cylinder, and from the latter is discharged outward near the top of the machine through the flue 16.

The vertical portion 12 of the intermediate flue extends down to the level of the small lower end of the cylinder, and the horizontal portion 13, located at such level, leads inward to such end.

At c is a mouth, located at the lower end of the vertical portion 12, at the under side of the flue between the bale-breaker and opener; that is to say, at the back of the bend or angle formed by the junction of the said vertical portion 12 with the horizontal portion 13. The opening or mouth c constitutes an inlet for air by the inward flow of which, induced by the suction caused by the rotation of the cylinder, and by the suction fan forming an element of the system, cotton falling within the vertical flue-portion 12, from the devices delivering cotton into such portion, is carried into the opener. The said mouth is located opposite or substantially opposite the horizontal flue-portion 13, at the back of the path of the cotton in descending within the mouth-piece 12, so that the air entering through the mouth carries the cotton directly into the said horizontal flue-portion 13.

In Figs. 1 to 5, the lower portion of the mouth-piece is downwardly flaring, so as to provide a downwardly inclined bottom b, such bottom sloping to the opening at c.

By reason of the suction into the opener a flow of air takes place inward through the open mouth c as well as through the horizontal flue-portion 13, whereby cotton descending through said vertical flue-portion is carried without loss into the opener, and any bunch or tuft of cotton dropping to the flaring bottom of the mouth-piece usually will be swept into the interior of the opener by the current of air flowing inward through the mouth-piece. Only heavy unopened tufts or bunches are likely to fall outside. A heavy compact object, such as a buckle, nail, stone, or the like, will not only drop by reason of its gravity to the inclined bottom of the mouth-piece, but will slide down the slope of such bottom so as to fall outside from the lower end of the latter. The tendency to slide down the said sloping bottom will offset any tendency of the buckle or other heavy object resting on such bottom to be swept into the horizontal flue-portion 13 with any tufts, etc., of cotton which may become engaged therewith, and eventually being carried into the opener.

For the purpose of enabling the area of the mouth-opening to be varied from time to time, as may be found necessary in order to secure the desired results in operation, I provide a damper in connection with the same. In the present instance the said damper is in the form of a slide-door d, held in place by guides e, e, in which it may be slid to close or open the mouth-opening more or less, so as thereby to regulate the rate of flow of air inward through the mouth-opening and through the horizontal flue-connection 13, as may be required in order to secure the required carrying capacity, and for other purposes.

It will be perceived that an important feature of the invention consists in the providing of a discharging mouth in connection with the intercommunicating flue between the bale-breaker and the vertical opener. Such mouth is advantageously located at a bend or angle where the said flue changes direction from an up-and-down direction to a horizontal or substantially horizontal one. Form and construction, etc., may be varied more or less without involving any change of principle or departure from the invention, as for instance in the case of the modified construction of mouth-piece shown herein in Figs. 6, 7 and 8, and constituting the subject of my divisional application for U. S. Letters Patent filed June 6, 1922 Serial No. 566,358.

The mouth-piece 121 shown in Figs. 6, 7 and 8 omits the sloping bottom of the mouth-piece of Figs. 1 to 5, and instead is formed with a continuation $b'$ below the air-inlet $c'$ and the flanged opening $e^2$ with which the horizontal flue-connection 13 connects, such continuation having at its end a discharging opening $c^2$. Heavy objects descending within the mouth-piece fall through the end opening $c^2$, while the cotton is carried into and through horizontal flue-connection 13 by the air entering by the air-inlet $c'$ at the back of the mouth-piece. A sliding damper $d$ is provided in connection with air-inlet $c'$.

What is claimed as the invention is,—

1. The combination with an opener, and a machine operating to supply fibrous material to said opener, of a connecting flue having a downwardly extending portion and a change of direction toward the opener, and having also below the bend or angle of the flue a support upon which heavy objects accompanying the fibrous material will fall by gravity, and an air inlet so disposed that by air entering the same and flowing inward over said support fibrous material upon or adjacent the same will be carried to the opener.

2. In preparing machinery, the combination with an opener, and a machine operating to supply fibrous material to said opener, of a connecting flue having a downwardly extending portion and a change of direction toward the opener, and having also below the bend or angle of the flue an incline upon which heavy objects accompanying the fibrous material will fall and along which they will slide and thereby become discharged, and an air inlet so disposed that air entering the same will flow from its foot toward the more elevated portion of said incline and fibrous material upon or adjacent the latter will be carried to the opener.

3. The combination with an opener, and a machine supplying cotton or the like thereto, of a mouth-piece extending downward from the delivery devices of said machine, and a flue-portion connecting the lower portion of said mouth-piece with the opener, said mouth-piece having an opening therein opposite and substantially in line with the passage through said flue-portion, and having also an inclined discharging bottom for heavy objects falling within the mouth-piece.

4. In preparing machinery, the combination with a bale-breaker, and a vertical opener, of a connecting flue extending downward from the delivery portion of the bale-breaker to the lower end of the opener cylinder, and having a discharging mouth at the under side of the same, and means for varying the area of the opening of said mouth to control the flow of air therethrough.

5. In preparing machinery, the combination with a bale-breaker, and a vertical opener, of a vertical mouth-piece through which material delivered from the bale-breaker descends, a horizontal flue-connection from the lower portion of said mouth-piece to the opener, said lower portion having an air inlet in line, substantially, with the passage through said horizontal flue-connection, and a damper by which the area of said air-inlet may be varied to regulate the rate of flow of air into and through said flue-connection.

In testimony whereof I affix my signature in presence of two witnesses.

JOSEPH MOSS.

Witnesses:
GEORGE F. ALBRECHT,
HERMAN NOVA.